Nov. 9, 1971     D. J. BILINSKI     3,618,403

STOP ASSEMBLY FOR A GYROSCOPE

Filed March 3, 1969

INVENTORS:
DONALD J. BILINSKI
RICHARD CIMERA

BY

*S. A. Giuvvatance*

ATTORNEYS

United States Patent Office 3,618,403
Patented Nov. 9, 1971

---

3,618,403
STOP ASSEMBLY FOR A GYROSCOPE
Donald J. Bilinski, Randolph Township, Dover, and Richard F. Cimera, Fairfield, N.J., assignors to The Singer Company, New York, N.Y.
Filed Mar. 3, 1969, Ser. No. 803,907
Int. Cl. G01c 19/18
U.S. Cl. 74—5                                          6 Claims

ABSTRACT OF THE DISCLOSURE

A stop assembly for a gyroscope having a unitary mass member rotated by means of a drive shaft and connected to the shaft by means of a flexible connection member to permit universal tilting movement between the mass member and the shaft member. A stop means is mounted with respect to a least one of the members and is adapted to engage another of the members to stop the tilting movement after a predetermined amount thereof.

---

BACKGROUND OF THE INVENTION

This invention relates to a stop assembly for a gyroscope, and, more particularly, to such an assembly which limits relative tilting movement between the flywheel of a gyroscope and its drive shaft.

Two-degree-of-freedom gyroscopes utilizing a relatively large and heavy rotor or flywheel, and having a universal joint connection between the flywheel and its drive shaft to permit relative tilting between the two, are well known. In such arrangements when the flywheel is rotated at a high speed it serves as an effective gyroscope which will maintain the same orientation in space despite relative tilting between it and the drive shaft about either of the two coordinate axes perpendicular to the spin axis in response to change in direction and/or attitude of the vehicle in which the gyroscope may be mounted. Several types of universal joint connections have been used, including a two-piece ball and socket connection, a one-piece solid flexure rod with a necked down center portion, a three-piece gimbal assembly, and a flexure type multi-gimbal connection.

In many of these arrangements a stop means is provided to limit the relative tilting movement between the flywheel and its drive shaft. For example, a single stop assembly has been proposed which is mounted either with respect to the flywheel or with respect to the drive shaft, and which is engaged by the other after a predetermined amount of tilting has occurred, to thus limit the tilting. However, it can be appreciated that, upon stopping a torque would be generated which would be taken up by one point on the stop, and which would load the universal joint connection between the flywheel and the drive shaft, and thus possibly damage, or even break, the connection.

In an effort to overcome this, United States Patent 3,354,726, which is assigned to the same assignee as the present application, proposes a double stop assembly which constrains the freedom of the flywheel at two diametrically opposite points, and thus cancels any loading of the universal joint connection. However, this double stop assembly contains eight spaced fingers which successively engage the wheel when it is torqued into the stops; and as the flywheel precesses from finger to finger, it vibrates over the interrupted surface formed by the fingers. Since the flywheel rotates at a very high rate, these vibrations occur at a very high frequency and are very undesirable.

SUMMARY OF THE INVENTION

It is therefore an object of the present invention to provide a stop assembly for a gyroscope which enjoys the advantages of the double stop assembly, while permitting superior vibration performance.

It is a further object of the present invention to provide a stop assembly of the above type in which damping is controlled to a minimum.

Briefly summarized, the stop assembly of the present invention comprises stop means mounted with respect to the flywheel, the drive shaft, or the connection member of a gyroscope and adapted to engage one other of these members after a predetermined amount of tilting movement between the flywheel and the shaft, for limiting the tilting movement. The stop means provides at least one continuous circular contact area for engagement by said other member, which engagement is a line-to-surface contact.

BRIEF DESCRIPTION OF THE DRAWINGS

Reference is now made to the accompanying drawings for a better understanding of the nature and objects of the stop assembly of the present invention, which drawings illustrate the best mode presently contemplated for carrying out the objects of the invention and its principles, and are not to be construed as restrictions or limitations on its scope. In the drawings.

DESCRIPTION OF THE PREFERRED EMBODIMENTS

Figure 1:
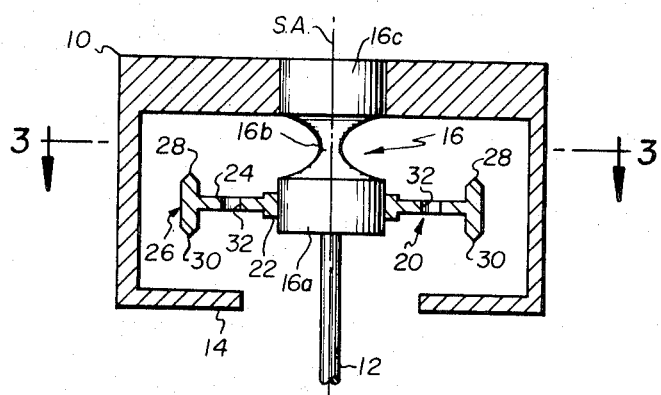
FIG. 1 is a vertical cross-sectional view showing the stop assembly of the present invention.

Referring specifically to the drawings, the reference numeral 10 refers to a rotor, or flywheel, which is generally circular in shape and which is driven by a drive shaft 12 to spin about the spin axis SA. The bottom portion of the flywheel has an inwardly extending flange 14 so that the flywheel generally encloses a flexure rod 16 forming a universal joint connection between the flywheel 10 and the drive shaft 12. It is understood that the drive shaft is normally mounted with respect to a housing for a gyroscope, while being rotated in suitable bearings by an electric motor, or the like, the housing and bearings being omitted from the drawings in the interest of brevity.

The flexure rod 16 may be formed of a unitary solid cylinder of resilient spring metal, having an end portion 16a fixed to the drive shaft in any known manner, and a symmetrically machined, or otherwise necked, portion 16b extending between the end portion 16a and an upper end portion 16c which is pressed into, or otherwise fixedly fastened, to the flywheel 10. Thus an effective gyroscope is formed with the flywheel 10 maintaining a fixed spatial position upon being rotated at a high speed, despite tilting of the gyroscope housing, and therefore the drive shaft 12, with respect to the flywheel in response to changes in direction or attitude of the vehicle in which the gyroscope is mounted. It is emphasized that the flexure rod 16 forms no part of the present invention, and that any other type of known universal type connection can be provided between the drive shaft 12 and the flywheel 10 as long as the two-degree-of-freedom movement is permitted between the two members. For example, the joint connection shown in the above mentioned U.S. patent, or the connection disclosed in U.S. patent application Ser. No. 762,514, filed Sept. 25, 1968, and also assigned to the same assignee as the present application, may be utilized.

According to the present invention a stop assembly, shown generally by the reference numeral 20, is provided, which has a hub portion 22 pressed over, and fitted to, the end portion 16a of the flexure rod 16. A circular plate portion 24 extends radially outwardly from the hub portion and has a circular flange 26 fixed to the outer edge thereof which extends parallel to the spin axis SA. This flange is provided with two knife edge contact portions 28 and 30 at its upper and lower ends, respectively, as viewed in FIG. 1.

Figure 2:
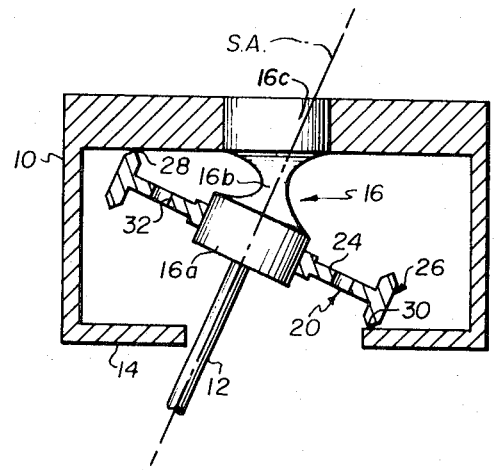
FIG. 2 is a view similar to FIG. 1 but showing relative tilting movement of the shaft with respect to the flywheel.

The stop assembly 20 is positioned relative to the internal surfaces of the flywheel 10 and the flange 14 so that upon a predetermined amount of tliting movement of the drive shaft 12 relative to the flywheel 10 about the spin axis SA, the knife edge contact portions 28 and 30 will engage an inner surface of the flywheel 10 and the flange 14 at diametrically opposite positions, as shown, for example, in FIG. 2. These knife edge contact portions 28 and 30 thus permit a line-to-surface contact to be achieved between the stop assembly and the flywheel, and, due to this reduced area of contact, damping of the tilting movement is minimized. Of course, this double diametrically opposed engagement distributes torque about the flexure rod 16 and cancels any loading thereon, thus eliminating damage and possible failure of the rod, while adding strength to the entire assembly.

Figure 3:
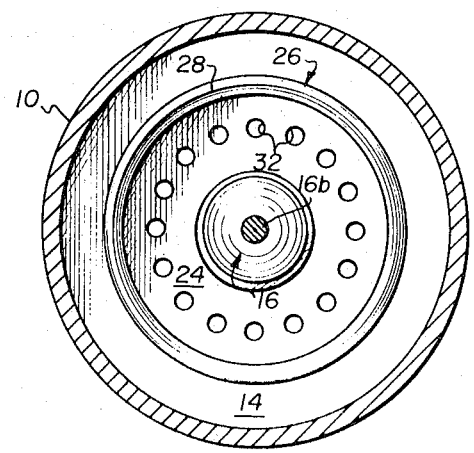
FIG. 3 is a transverse cross-sectional view taken along line 3—3 of FIG. 1.

According to another feature of the present invention, the knife edge contact surfaces presented by the edges 28 and 30 form a continuous circle as shown in FIG. 3, so that upon initial contact between them and the corresponding surfaces of the flywheel 10 and the flange 14, the flywheeel will roll continuously around the circle in response to the resulting precession, and will do so without any interruptions and resulting vibrations.

Since it may be desirable to enclose the above components in a gas filled sealed housing in a manner well known in the art, a plurality of holes 32 are provided through the plate portion 24 of the stop assembly as better shown in FIG. 3, so that the gas filling the gaps between the various components does not dampen the tilting movement of the shaft 12, since any pressure tending to build up will be relieved through any or all of the holes 32. Of course, by controlling the size of the holes 32, the damping characteristics can thus be precisely controlled.

Although the above example has been predicated on the assumption that the flywheel, upon rotation, maintains a fixed spatial position and that the housing and drive shaft tilt with respect to the flywheel in response to movement of the vehicle, this is not an absolute requirement. Rather, any other relative movement between two of the above three basic components can take place according to known principles, without departing from the scope of the invention.

Also, the stop assembly of the present invention can be used in connection with any other type of members connected by a universal joint connection, in the event it is desired to limit the relative tilting movement between the members.

Of course, other variations of the specific construction and arrangement of the stop assembly disclosed above can be made by those skilled in the art without departing from the scope of the invention as defined in the appended claims.

We claim:

1. A gyroscope comprising a flywheel member having a hollow portion, a shaft member for rotating said flywheel member about an axis, and a connection member disposed within said hollow portion and supporting said flywheel member on said shaft member while permitting universal tilting movement between said flywheel member and said shaft member about said axis; wherein the improvement comprises a plate mounted with respect to said connection member and having a flange portion extending parallel to said axis, said flange portion providing a contact portion arranged so as to engage one other of said members after a predetermined amount of said tilting movement for limiting said tilting movement, the engagement between said flange portion and said other member being a line-to-surface contact.

2. The improvement of claim 1 wherein said flange portion presents two continuous circular contact surfaces for engagement by the inner surfaces of said flywheel member upon said tilting movement, said plate being positioned with respect to said flywheel member so that said engagement occurs at two dimetrically opposite positions.

3. A gyroscope comprising a flywheel member having a hollow portion, a shaft member for rotating said flywheel member about an axis, and a connection member disposed within said hollow portion and supporting said flywheel member on said shaft member while permitting universal tilting movement between said mass member and said shaft member about said axis; wherein the improvement comprises a plate mounted with respect to said connection member and having a flange portion extending parallel to said axis, said flange portion providing at least one continuous circular contact surface for engagement by one of said other members.

4. The improvement of claim 3 wherein said flange portion presents two continuous circular contact surfaces for engagement by the inner surfaces of said flywheel member upon said tilting movement, said plate being positioned with respect to said flywheel member so that said engagement occurs at two diametrically opposite positions.

5. A gyroscope comprising a housing containing gas, a mass member disposed in said housing, a shaft member for rotating said mass member, a connection member supporting said mass member on said shaft member while permitting universal tilting movement between said mass member and said shaft member with said gas damping said tilting movement, and means for controlling the damping of said tilting movement, wherein said means for controlling the damping comprises a plate fixed with respect to one of said members and having at least one opening extending therethrough for relieving the gas pressure resulting from said tilting movement.

6. The gyroscope of claim 5 further comprising a flange portion extending from said plate and adapted to engage the other of said members to limit said tilting movement.

References Cited

UNITED STATES PATENTS

| 2,457,150 | 12/1948 | Herondelle | 74—5.45 X |
| 3,077,785 | 2/1963 | Stiles | 74—5 |
| 3,315,533 | 4/1967 | Litty | 74—5 |
| 3,354,726 | 11/1967 | Krupick et al. | 74—5 |
| 3,081,552 | 3/1963 | Reason | 74—5 X |
| 3,142,181 | 7/1964 | Moller | 74—5.5 X |

FOREIGN PATENTS

| 870,761 | 12/1941 | France | 74—5.5 |

MANUEL A. ANTONAKAS, Primary Examiner

U.S. Cl. X.R.

74—5.5